Jan. 23, 1962 J. N. FRANK 3,017,724
TILE WALL CONSTRUCTION
Original Filed July 28, 1958 2 Sheets-Sheet 1

INVENTOR.
John N. Frank
BY Green, McCallister & Miller
HIS ATTORNEYS

Jan. 23, 1962     J. N. FRANK     3,017,724
TILE WALL CONSTRUCTION
Original Filed July 28, 1958     2 Sheets-Sheet 2

INVENTOR.
John N. Frank

BY Green, McCallister & Miller
HIS ATTORNEYS

United States Patent Office 3,017,724
Patented Jan. 23, 1962

3,017,724
TILE WALL CONSTRUCTION
John N. Frank, Sapulpa, Okla., assignor to Frankoma Pottery, Sapulpa, Okla., a corporation of Oklahoma
Continuation of application Ser. No. 751,457, July 28, 1958. This application Apr. 28, 1960, Ser. No. 25,486
9 Claims. (Cl. 50—265)

This invention relates to a composite wall construction utilizing a glass backing member with tile facing members and particularly, to a unitary construction in which the peculiar characteristics of glass are utilized in an improved manner by employing tile facing on one or both sides of the glass member. An incident to the invention is the pleasing light effects that are made possible by the utilization of such a structure.

This is a continuation of my application No. 751,457, filed July 28, 1958, entitled "Tile Wall Construction."

It is well-known that glass has no definite elastic limit, as shown by its stress-strain diagram and in this respect, it is unlike a metal. It tends to break suddenly due to its brittle characteristics. In recent years, there has been a need for wall structural members which will replace conventional walls, particularly in connection with ranch type homes and those built in the warmer climates. In this connection, glass from the standpoint of its transparent and translucent properties is desirable. However, its use in this connection has been more or less limited because of its structural nature, in the sense of its tendency to break unexpectedly or particularly, when placed under stress or strain.

In the utilization, such as here contemplated, the wall member will be subjected to considerable variations in ambient temperature and there may be a considerable difference in temperature on an outer side, as compared to an inner side of the member. Also, it has been determined that glass may lose a considerable portion of its strength when its surface is roughened or corroded in any manner, and thus, may fail when not provided with some protection. Heretofore, it has been determined that by reason of its characteristics, glass does not provide a fully practical material for a backing wall member, not only due to its tendency to expand and contract with changes in temperature, but also because of its lack of transverse or lateral strength and its brittleness.

I have found that there is a need for a wall construction of a composite nature to provide a sound and practical structure of pleasing appearance, one that will pass light therethrough without the necessity of conventional windows, and one that will make a practical utilization of so-called plate or window glass as a backing member.

Heretofore, tile members have been applied to walls, floors and ceilings of buildings, but have been found to require a relatively rigid or stable type of backing member construction to properly carry and support them. That is, tile members, as heretofore constructed and employed have a tendency to swell, bulge or break-away at their joints or even fail across the section of their bodies when mounted on a backing member or structure that has a characteristic of movement or displacement, such as by expansion or contraction.

Since plate or window glass has an inherent characteristic, even when annealed, of considerable lateral expansion, in the neighborhood of three times its linear expansion coefficient, it has heretofore been assiduously avoided as a tile backing member. The problem, of course, becomes more complex, where as here, it is contemplated that a considerable area or expanse of backing member may be used. The use of glass also introduces the factor of central buckling in a large expanse of vertical wall structure, such that key tile members may lose their supported and particularly, vertically-supported relation with each other in their assembled plane. In other words, a tile wall construction has heretofore required a stable backing surface perpendicular to its vertical plane, in order that such plane will not become unbalanced, and cause failure. To those skilled in the art, planar, depthwise rigidity has been the watchword for a tile wall construction which has definitely precluded use of a glass backing member.

In carrying out my invention, I have discovered new criteria which, for the first time, has made practical the utilization of a glass backing member for a tile wall. It has not only made such a construction practical, but has made possible a relatively inexpensive composite tile wall construction, one that provides light through a plurality of relatively small windows or central openings in the tile members. Thus, I have been able to get pleasing clear light patterns and still have a colored wall that is substantial. This has been the goal of architects for years and I feel that I have successfully solved the problem of clear light through a colored wall.

It has thus been an object of my invention to solve the problem involved in employing a glass member as a backing member, so that its desirable light-passing properties may be utilized without the disadvantages of its unstability from a strength standpoint;

Another object of my invention has been to develop a new and improved wall structure that may be used in connection with windows, screens, doors, side walls, etc., of a building construction;

A further object of my invention has been to devise a new form of wall construction which will make a practical and efficient use of a glass member and its light reflecting or passing properties;

A still further object of my invention has been to devise a new and improved unitary or composite wall construction which will utilize an at least translucent glass backing member and which utilization will provide a windowed wall member with improved strength characteristics as compared to glass alone;

These and other objects of my invention will appear to those skilled in the art from the drawings and the description which follows.

In the drawings, FIGURE 1 is a front view in elevation of a tile member suitable for employment in the construction of my invention;

Figure 5:
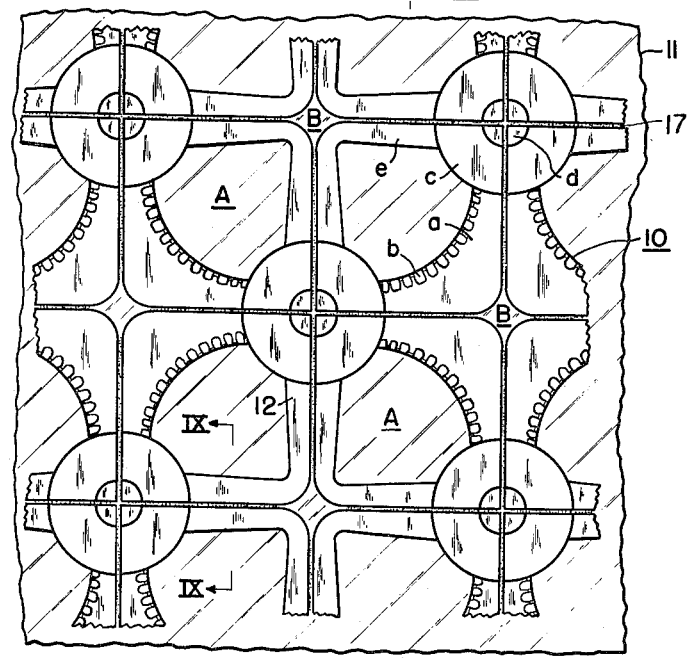
FIGURE 5 is a front view in elevation on a reduced scale of an assembled structure employing my invention and showing tile members of a type disclosed in FIGURES 1 to 4, inclusive, employed as quadrants or segments of a tile facing member panel applied to a glass backing or wall member.
Figure 9:
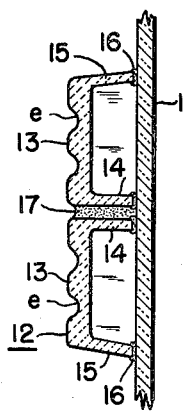

And, FIGURE 9 is an enlarged fragmental end section in elevation taken along the line IX—IX of FIGURE 5.

In accordance with my invention, I have made the discovery that the nature, shape or construction of the tile members employed in a wall-like or vertical tile assembly constitutes an important factor in providing a solution to the problem involved. In this connection, I have determined that each tile member of the plurality of members employed in the wall construction should have an integral shape and strength of body or section, such that when assembled, they will provide a unitary, vertical-supporting, substantially planar assembly for each other. In this connection, planar rigidity or rigidity in the plane of its body panel is required. This, however, in itself, it not sufficient, in that a second and highly important factor must be met, namely that each tile should have an inherent or built-in property of some flexibility or or resiliency to movement or expansion (or contraction) perpendicular or at right angles of the surface or planar outer face or panel of its body.

In this connection, I have discovered that tile of ceramic, metal, glass and plastic (resin) materials is suited, provided that each tile member has the proper type of construction. As to the latter, each tile member, in accordance with my invention, has a continuous or unbroken framing or bounding rim area or periphery, a central open or window portion of greater width extent than the bounding or framing area, and is made up of a horizontally-outwardly or forwardly-spaced connecting body, face or panel portion that carries a pair of backwardly-projecting and laterally or surface plane spaced-apart, positioning, mounting or contacting leg or edge portions. The mounting edge portions are continuous about the open or window portion and the periphery of the outer edge boundary of the tile member to rest upon the backing member with edge contacts and secure or mount the tile member thereto. In other words, one (outer) continuous mounting edge portion frames or bounds the side periphery of the tile member and the second (inner) continuous mounting edge portion frames or bounds the periphery of the open or window portion.

In accordance with the above criteria, the tile members are employed as a group with the sides of their outer peripheral mounting edge or leg portions in an opposed relationship with each other to define a substantially planar vertical assembly that is supported by the opposed sides of their outer mounting edge portions in a closely aligned relation with respect to each other and, as an assembly, at least between upper and lower, and preferably also, between opposed side structural members of building framing members. Each individual tile body is resilient (due to its construction), so that each tile of the assembly may expand and contract perpendicular of its face portion in a limited manner with localized areas of the backing member and as a composite part therewith, without failure through their bodies or at their joints, and without losing their unitary, vertical, as well as horizontally-combined supported relationship.

The tile members, in accordance with my invention, may be secured or applied susbtantially parallel to or upon the face of a glass backing member by suitable material, such as mastic. This produces a unitary or composite structure which divides the backing member into spaced framing areas between the edge contacts of each tile member, in order to expand and contract, without damage to the tile assembly, and in which the tile assembly will expand and contract therewith, while providing reinforcing resistance thereto, such that the ultimate expansion and contraction is about half the normal for the plate glass member, per se. As a result, bulging, cracking and breaking of the tile of the assembly is avoided and the backing member is, in effect, reinforced and protected by the tile facing assembly. The glass backing member expands in a controlled manner by providing it with a plurality of continuous and laterally spaced-apart framing contacts along its face. As a result, the backing member has a series of local expansion areas, not one unitary area that would cause a maximum bulge at its central portion. It will be noted that the glass backing member is supported along or about its side edges, in a usual manner for a window or the like, by framing members of the building or other construction. A unitary wall construction is provided that is flexible, but has greater strength than the tile assembly or the plate member individually, and which materially strengthens the plate backing member, so that a reinforced wall structure of greater improved characteristics is provided. The old bugaboo of expansion and contraction as to tile backing members has been met and many pleasing patterns and window effects are made possible. For example, the tile surfaces may be provided with a color or a combination of colors to provide a colored wall through which light may enter by a plurality of window apertures.

Although not essential, best results are obtained by making use of the grouting, putty, or cement between opposed sides of the outer mounting leg or edge portions of the tile members. As shown in the drawings, the tile members are of one-piece construction and may be made up of quadrants in the form of rectangle or square outlined shapes to form a series of unitary designs on the glass backing member, with each design having a plurality of closed windows, each essentially provided by the large central open area of each tile quadrant and by a smaller area defined between cooperating rounded corners of the tile quadrants. In the composite wall, the open portions of the tile members cooperate with the backing member to provide windows through which lights passes. The particular design of the tile may be varied, provided the above criteria is followed, so that each tile member, in effect, provides area-framing and expansion-controlling, mounting contacts with the backing member. The leg or edge mounting portions, by reason of their nature and location, provide substantially balanced, opposed expansion-force-applying means for inner and outer side edges of the rim face portion of each tile member that are forwardly spaced from the backing member. As a result, the tile members are somewhat resilient to force applied perpendicular to their face portions which are of relatively narrow or framing nature, but are substantially rigid to force applied along or in the plane of such face portions.

Figure 2:
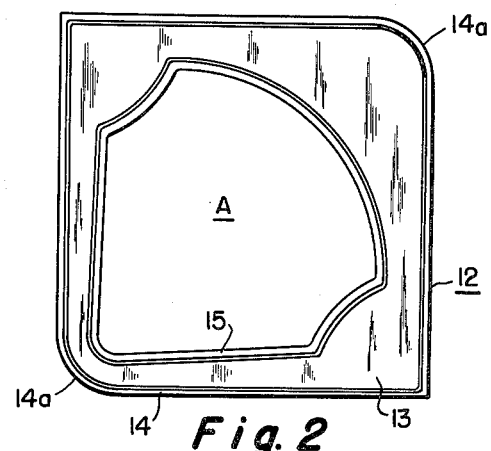
FIGURE 2 is a back view in elevation of the under side of the tile construction of FIGURE 1 and on the same scale as such figure.
Figure 3:
FIGURE 3 is a vertical section on the scale of and taken along the line III—III of FIGURE 1.
Figure 4:
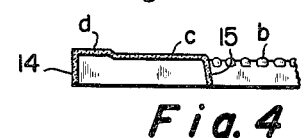
FIGURE 4 is a vertical sectional detail on the scale of and taken along the line IV—IV of FIGURE 1.

Referring particularly to the illustrated embodiment of the drawings, I have shown a somewhat square or rectangular shaped ceramic tile member 12 having a body provided with a connecting or outer face portion 13 that lies substantially in the face plane of an assembly 10. The body of each tile member 12 also has a pair of laterally spaced-apart, backwardly-projecting, mounting edge contact or leg portions 14 and 15. As shown particularly in FIGURES 2, 3 and 4, an outer mounting edge or leg portion 14 is of continuous construction and bounds the outer side edge periphery of the tile 12, and mounting edge or leg portion 15 is of continuous construction and bounds the inner edge periphery of the tile member or the outer periphery of its window or open portion A. It will be apparent that as a result of the edge bonding, the leg portions 14 and 15 define an enclosed or dead air space between the face portion of each tile and the glass backing member (see FIGURE 9). It will be noted that the front rim or face area defined by the connecting or face portion 13 of the body of the tile member is relatively narrow and of less width area about the tile than the window portion. This, with the nature of the material and the mounting and shape of the tile, gives it some resilience depthwise or perpendicular to its face plane.

Figure 1:
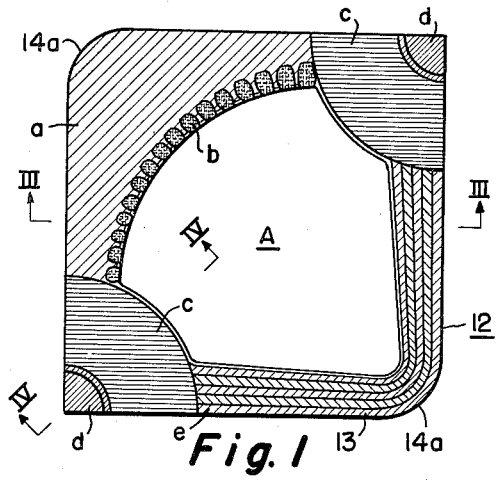

With particular reference to FIGURE 1, the face or connecting portion 13 which lies substantially parallel to the planar face of the assembly 10 (see FIGURES 5 and 6) may be any suitable configuration, such as illustrated. In this connection, the portion $a$ is shown as having a smooth or planar, slightly outwardly-offset face and as provided with a further slightly outwardly-offset beaded edge *b* along the central open or window portion A. Diagonally opposite angular corner portions of the tile member 12 of FIGURE 1 are shown provided with a substantially planar quadrant portion *c* and a slightly raised corner quadrant portion *d*. An elbow-shaped corner face *e* of the tile is shown provided with longitudinally-extending ribs and grooves (see FIGURE 3). For decorative purposes, the portion *a* may be one color corresponding to or different (light brown) than the portion *b* (for example, gold), the portion *c* may have another color (for example, light blue), the portion *d* may have a still different color (such as brown), and the portion *e* may have one or more colors (for example, green valleys or grooves and brown ribs or ridges). It will be apparent to those skilled in the art that the particular color combination or lack of color is a matter of choice but makes possible a so-called color type of window wall. A glaze or enamel, as applied to a ceramic or metal tile member, has been found to be highly satisfactory.

Figure 6:
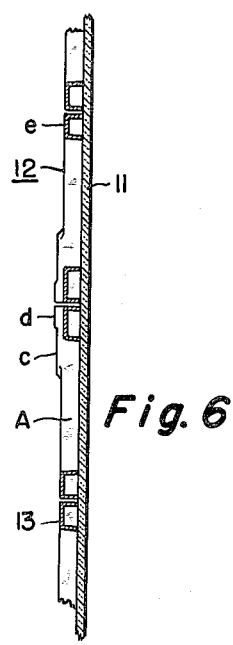
FIGURE 6 is an end section in elevation on the scale of and taken along the line VI—VI of FIGURE 5.

In FIGURE 5, I have shown how the tile members 12 may be mounted in a suitable patterned relationship as quadrants, so that four complementary tile form a somewhat symmetrical pattern of a series of such patterns, and may provide small light apertures B as defined by the rounded corners of adjacent tile members. It will be noted that diagonally opposite corners 14*a* of the tile of FIGURE 1 are shown of rounded shape. FIGURES 5 and 6 illustrate how the tile members 12 are positioned on a unitary plate glass upright backing member 11 that with the tile members provides a unitary or composite structure of improved characteristics.

Figure 8:
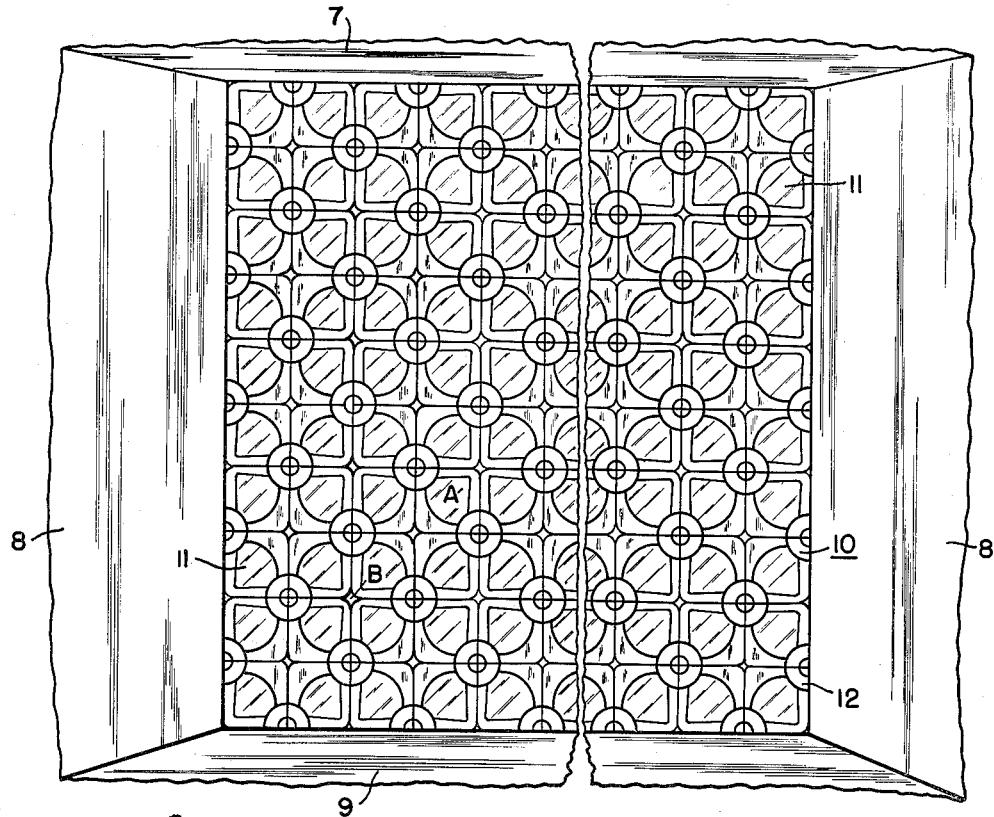
FIGURE 8 is a fragmental sectional view in elevation on a reduced scale, showing the employment of a wall construction of my invention in connection with the room of a building.

In FIGURE 8, I have illustrated how a wall construction of my invention may form a part or exposed side of a building that, as illustrated, has a ceiling or top wall 7, opposed side walls 8 and a floor 9. It is apparent that the assembly may thus constitute a full width and height extent of at least one vertical wall of the building. I have also employed this construction in connection with screens and partitions as well as doors, but in each case, provide framing members about the full extent of the wall construction, so that the tile assembly of such wall construction is held in place both vertically and horizontally, and the backing plate member 11 is held in place along its outer edges.

Figure 7:
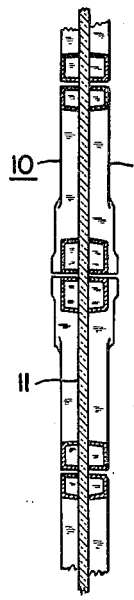
FIGURE 7 is a view on the scale of and similar to FIGURE 6 showing a modified construction in which tile members are applied to opposed or opposite sides of a glass plate member.

In FIGURE 7, I have shown how a pair of tile assemblies 10 and 10' may be utilized with a single backing member 11 by mounting them in substantial depthwise or "through" alignment on opposite sides of the backing member. In FIGURE 9, I have shown how the tile members 12 may be secured to the backing member 11 by utilizing mastic or other securing material 16 along the contact edges of the mounting portions 14 and 15. I have also shown grouting 17 to fill the spacing between and secure sides of opposed outer leg or mounting edge portions 14 of adjacent tile members 12 together.

By way of further example, I have successfully used non-transparent ceramic tile members having about an 8 by 8 inches face dimension, a ½ of an inch projection of leg portions, and about a ⅛ of an inch of thickness of face and leg portions (body). This provides a tile, the backward extension of whose leg portions, has a ratio of about 1 to 4 with respect to the width of the planar outer side of the body.

I have found that a composite wall construction of my invention may be perfectly planar or may be curved or formed in various shapes, as needed, for a particular building construction. This is true as long as the basic criteria of the invention is followed.

What I claim is:

1. In a composite building wall construction having an upright glass backing member supported along its bounding edges and having an assembly of closely adjacent tile members mounted on and substantially fully along at least one face thereof in a substantially parallel aligned relation therewith, the combination of framing members supporting the tile assembly on the glass backing member in the direction of the parallel alignment of its tile members and at least along top and bottom sides of the assembly, each of the tile members having a relatively rigid body of a material such as ceramic material and of one-piece construction, said body having an outwardly-positioned front face portion defining a central open portion on the glass backing member of greater area than said face portion, a pair of backwardly-projecting and transversely spaced-apart leg portions of substantially planar section connected by said face portion and of lesser extent than said face portion, one of said leg portions extending continuously about and defining a framing wall for said open portion on the glass backing member and the other leg portion extending continuously about and defining an outer peripheral side wall about the tile member, bonding means securing said pair of leg portions of each tile member to the face of the backing member with outer leg portions of the tile members of the assembly in a closely adjacent relation with respect to each other, the construction being characterized by expanding and contracting substantially less than the normal expansion and contraction of the glass backing member alone and as controlled by a plurality of continuous and transversely spaced-apart framing edge contacts along the face of the backing member as defined by said spaced-apart legs of the tile members, and being further characterized by a series of localized expansion and contraction areas along the backing member between the framing edge contacts of and at the central open portions of the tile members.

2. A wall construction as defined in claim 1 wherein, each tile member is of similar shape and construction and is positioned to define a quadrant of a four-part pattern along the extent of the assembly of tile members, and the construction has the characteristic of about one-half the normal expansion and contraction of the glass backing member alone.

3. A construction as defined in claim 1 wherein, each tile member has a pair of diagonally-opposed rounded corners and a pair of diagonally-opposed right-angle corners, and the tile members are assembled in such a manner that small spaces open to the glass backing member are defined by the rounded corners of adjacently-positioned members to provide small light apertures with the backing member in combination with the larger central open portions defined by each tile member.

4. A composite building wall construction as defined in claim 1 wherein, said pair of leg portions are of substantially equal backward extent and define framing edge contacts for the backing member, and said pair of leg portions in their secured relationship on the face of the backing member define an enclosed air space between each tile member and the glass backing member.

5. A composite building wall construction as defined in claim 1 wherein like assemblies of the tile members are secured on opposite faces of the backing member in a depthwise-aligned relationship with respect to each other through the wall construction.

6. In a tile construction for a window wall employing an upright glass backing member, a one-piece substantially rigid ceramic body having a continuous outwardly-positioned rim face portion defining a substantially planar outer face thereof and framing a central open portion therethrough of substantially greater area than said rim face portion, a pair of backwardly-projecting laterally spaced-apart and continuous mounting leg portions of substantially planar section connected by said rim face portion, said pair of leg portions being of substantially equal backward extent and defining framing edge contacts for the backing member, an inner leg portion of said pair framing said open portion with said rim face portion, and the outer leg portion of said pair framing an outer peripheral side wall about said body.

7. A tile construction as defined in claim 6 wherein said body is of substantially rectangular shape, its leg portions are of substantially equal backward projection of a ratio of about 1 to 4 with respect to the width of said rim face portion, and said rim face portion is of narrow bounding extent about said body and has a pair of opposed right-angle corners and a pair of opposed convex corners.

8. In a composite building wall construction having an upright glass backing member supported along its bounding edges and having an assembly of closely adjacent tile members mounted on and substantially fully along at least one face thereof in a substantially parallel aligned relation therewith, the combination of framing members supporting the tile assembly on the glass backing member in the direction of the parallel alignment of its tile members and at least along top and bottom sides of the assembly, each of the tile members having a relatively rigid body of one-piece construction, said body having an outwardly-positioned front face portion defining a central open portion on the glass backing member of greater area than said face portion, a pair of backwardly-projecting and transversely spaced-apart leg portions of substantially planar section connected by said face portion and of lesser extent than said face portion, one of said leg portions extending continuously about and defining a framing wall for said open portion on the glass backing member and the other leg portion extending continuously about and defining an outer peripheral side wall about the tile member, bonding means securing said pair of leg portions of each tile member to the face of the backing member with outer leg portions of the tile members of the assembly in a closely adjacent relation with respect to each other, said pair of leg portions in their secured relationship defining an enclosed air space between each tile member and the glass backing member, the construction being characterized by expanding and contracting substantially less than the normal expansion and contraction of the glass backing member alone and as controlled by a plurality of continuous and transversely spaced-apart framing edge contacts along the face of the backing member as defined by said spaced-apart legs of the tile members, and being further characterized by a series of localized expansion and contraction areas along the backing member between the framing edge contacts of and at the central open portions of the tile members.

9. In a tile construction for a window wall employing an upright glass backing member, a one-piece tile body that is substantially rigid as to force applied in the plane of its face portion and somewhat resilient as to force applied perpendicular to its face portion, said tile body having a continuous outwardly-positioned rim face portion defining a substantially planar outer face thereof and framing a central open portion therethrough of substantially greater area than said rim face portion, a pair of backwardly-projecting laterally spaced-apart and continuous mounting leg portions of substantially planar section connected by said rim face portion, said pair of leg portions being of substantially equal backward extent and defining framing edge contacts for the backing member, an inner leg portion of said pair framing said open portion with said rim face portion, and the outer leg portion of said pair framing an outer peripheral side wall about said body.

References Cited in the file of this patent
UNITED STATES PATENTS

| | | |
|---|---|---|
| 300,711 | Ingersoll | June 17, 1884 |
| 504,506 | Verhaghen | Sept. 5, 1893 |
| 1,637,793 | Vander Kamp | Aug. 2, 1927 |
| 2,529,945 | Hyman | Nov. 14, 1950 |